Figure 1:
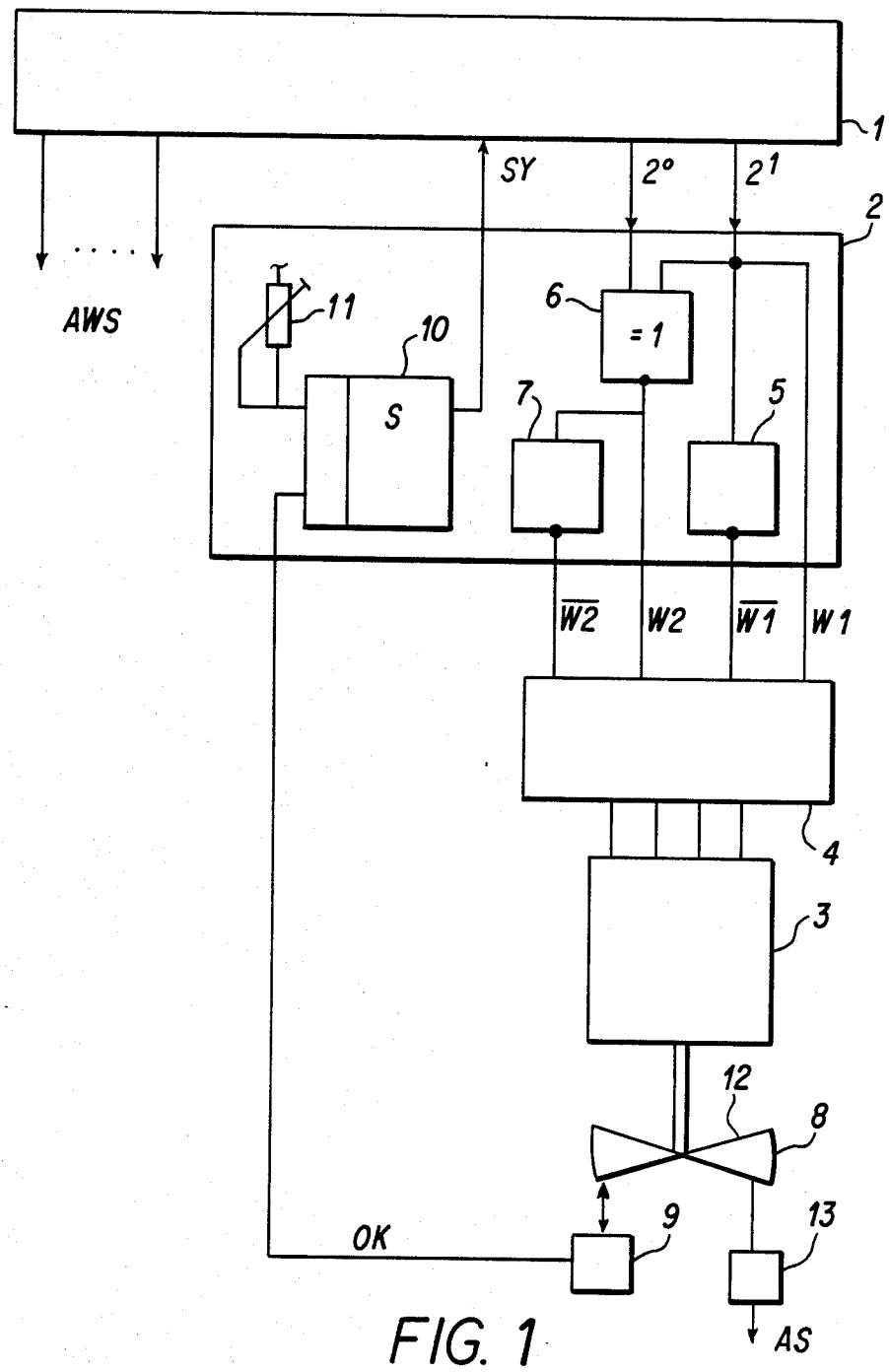

United States Patent [19]

Heinrich et al.

[11] Patent Number: 4,831,319

[45] Date of Patent: May 16, 1989

[54] METHOD FOR THE PHASE SYNCHRONIZATION OF STEP-DRIVE CONTROLLED EQUIPMENT

[75] Inventors: Winfried Heinrich; Horst Pawlik; Nikolaus Schmidt, all of Jena, German Democratic Rep.

[73] Assignee: Jenoptik Jena GmbH, Jena, German Democratic Rep.

[21] Appl. No.: 117,122

[22] Filed: Nov. 4, 1987

[30] Foreign Application Priority Data

Dec. 31, 1986 [DD] German Democratic Rep. .................................... 2989242

[51] Int. Cl.$^4$ ............................................. H02P 8/00
[52] U.S. Cl. .................................... 318/696; 318/685; 356/323; 356/325
[58] Field of Search .............. 318/696, 685; 356/323, 356/325

[56] References Cited

U.S. PATENT DOCUMENTS 4,281,897 8/1981 Fletcher .......................... 356/434 X
4,305,663 12/1981 Perkins et al. ...................... 356/323
4,386,852 6/1983 Cassidy et al. ..................... 356/323

Primary Examiner—William M. Shoop, Jr.
Assistant Examiner—Saul M. Bergmann
Attorney, Agent, or Firm—Jordan and Hamburg

[57] ABSTRACT

A method for the phase synchronization of equipment controlled by stepping drives, especially optical modulating systems for multiple-beam spectral photometers. Each time that the equipment is started up, a reference signal is made synchronous with a synchronizing signal which is derived from a sensor signal of the apparatus which is locked in phase with the intelligence signal. For a purely electrical correction the phasing between the intelligence signals and the synchronizing signal is set once. In the event of a phasing error between the synchronizing signal and the reference signal the reference signal is reset.

2 Claims, 3 Drawing Sheets

METHOD FOR THE PHASE SYNCHRONIZATION OF STEP-DRIVE CONTROLLED EQUIPMENT

The invention is directed to a method for the phase synchronization of step-drive controlled equipment, to signals or to other equipment. The invention is particularly directed to optical modulation systems for multiple beam spectral photometers which are driven by stepping motors, although it is not limited to such application.

BACKGROUND OF THE INVENTION

Continuously running equipment is often encountered in which signals are produced in synchronism with its operation. For example, demodulation signals are often needed for modulating systems, especially for multiple-beam spectral photometers, regardless of whether the modulating systems are driven by synchronous motors, as they generally have been (e.g., DD-PS No. 65 468) or by stepping motors (e.g., U.S. Pat. No. 4,386,852, DD-PS No. 228 058). In U.S. Pat. No. 4,386,852, a higher-frequency timing signal is disclosed for the purpose of producing therefrom, by means of a divider circuit, the control frequency of the stepping drive, and also for the purpose of forming a demodulation signal by means of an additional divider synchronized by the optical signal by means of a null detector.

This system, which is usable only for single-beam apparatus, also has the important disadvantage that, in the case of higher absorptions of the optical sample, the demodulation is impaired by noise.

In DD-PS 228 058, the pulses of the stepping drive control frequency are fed to the stepping drive, and are also carried through an adjustable delay circuit followed by pulse shortening. They control a counter logic such that the demodulation signals, which serve for the analog processing of the measurement, will be in phase with the electrical analog signals formed from the optical signals.

An optocoupler cooperating with the modulating mirror supplies for this purpose a synchronization signal which at the beginning of the modulation period resets the counter logic. This eliminates the disadvantages of U.S. Pat. No. 4,386,852, but since adjustment can be made with the adjustable delay circuit only within one step, it is necessary to pre-adjust the modulating mirror and optocoupler with a stepping motor energized in a defined manner, or to assemble them together in an apparatus with sufficient accuracy.

In addition to the complexity involved in the construction of the apparatus, the necessary pre-adjustment interferes with service to the modulating system including the optocoupler.

Also, in the case of aging phenomena, phasing errors occur between optical signals and analysis signals as the load torque changes at the stepping motor, and necessitate manual readjustment.

It has been proposed (GDR Pat. No. 242,089), for synchronization with respect to a given required-phasing signal, to make the stepping motor run one step per modulation cycle slower or faster by means of control frequencies differing from the synchronous frequency, until the required-phasing signal and sensor signal are sufficiently in agreement. Here the same disadvantages are encountered as in DD-PS No. 228 058.

It is furthermore generally known to operate a stepping drive not by pulses of a control frequency, but for example to produce commutator signals by means of a computer, whereby the windings of the stepping motor are switched.

SUMMARY OF THE INVENTION

The aim of the invention is to reduce the complexity of manufacturing and adjusting the stepping-drive-controlled equipment as well as to increase the accuracy, repeatability and reliability of the signal processing.

The invention is directed to a solution to the problem of creating a phase synchronization process of low complexity and long-term stability which is technologically easy to realize, in which correctly phased analysis signals are formed without optical and mechanical adjusting processes, and even momentary load angle changes on the stepping motor can be compensated for their effect on the phasing of the apparatus without requiring another calibration.

According to the invention this problem is solved by a method for the phase synchronization of stepping drive controlled equipment, especially optical modulating equipment for multiple beam spectral photometers, in which a stepping motor drives a device with whose phasing certain signals or other apparatus are synchronized. From the phasing of a sensor signal produced by the equipment, a synchronizing signal is produced for the synchronization of a reference signal for demodulation and control signals with electrical analog signals of the equipment, especially electrical analog signals derived from optical signals of a modulating system. Upon each start-up of the equipment, a reference signal is made highly synchronous with the synchronizing signal, and the phasing of the synchronizing signal is adjusted once to the phasing of the electrical analog signals by an electrical balancing. The phasing of synchronization signal is compared with the reference signal, and, in the event of a phase difference exceeding tolerance, the reference signal is each time re-synchronized with the synchronization signal.

It is advantageous if, for precise equalization, at least one electrical analog signal is compared directly with the synchronization signal and if, for the constant phase comparison between the synchronization signal and the reference signal within a tolerance range, a test signal is formed from the reference signal that is preferably symmetrical about its synchronizing edge, and is compared with the synchronization signal.

Each time that the equipment is turned on a reference signal is synchronized as closely as possible with the synchronizing signal. The stepped character of this setting process is due to the clock-controlled quantization of the information peculiar to the digital art.

The phasing of the synchronization signal is adjusted once to the phasing of the electrical analog signal.

This calibration of the equipment for the purpose of obtaining correctly phased demodulation and control signals for use as electrical analog signals is accomplished by a one-time purely electrical correcting process. In this manner any expense in the achievement of an optical or mechanical correction in the production of the apparatus, including such features of construction, is eliminated.

After synchronization has been performed, a check is made as to whether the recurrent synchronization signal lies within the reference signal synchronous with the demodulation and control signals with a suitable pulse length, and the analog analysis is blocked if a phase error occurs. In this case the reference signal is reset. Thus it becomes possible that even changes in the load angle, i.e., momentarily caused shifts in the phasing between commutator signals of the stepping motor and the rotor position, such as those which occur, for example, in the case of long-term changes in the moment of friction, will cause no phasing errors between the analog signals and their demodulation and control signals. Thus any long-term phasing errors are automatically compensated by the phase synchronization as a result of the phase correction of the reference signal without the need for a manual, electrical, optical or mechanical readjustment as rebalancing. For a long period of time, therefore, the apparatus will have a high accuracy, repeatability and reliability with regard to data processing.

It is furthermore desirable in the assembly of the modulation system to limit the allowable range in the phase difference between the electrical analog signal and the sensor signal so that, for instance, the temperature-caused error in the electrical correction will remain sufficiently small.

This precaution in manufacture, however, is not to be compared with the trouble involved in a mechanical or optical correction.

BRIEF FIGURE DESCRIPTION

Figure 2:
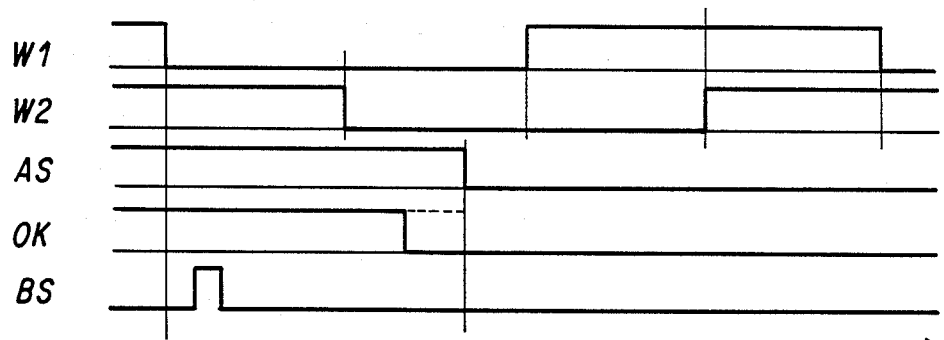
Figure 3:
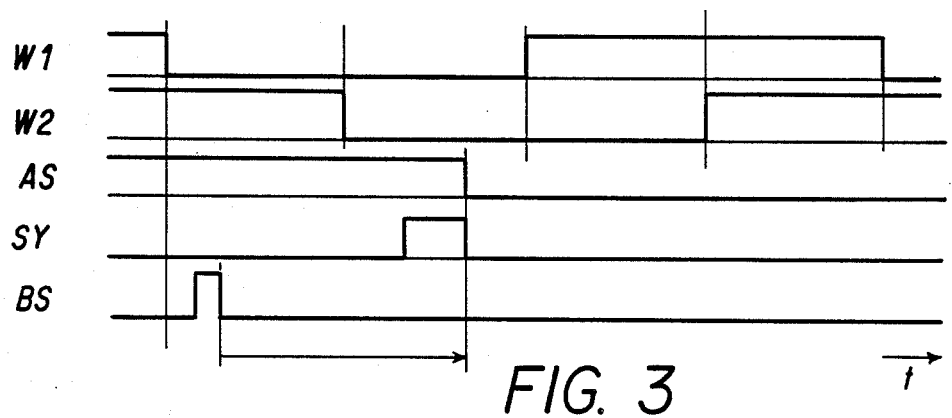
Figure 4:
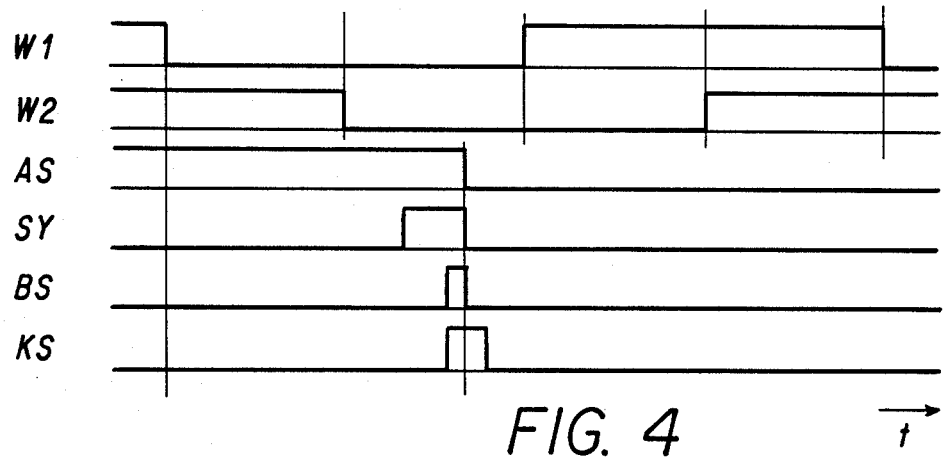
Figure 5:
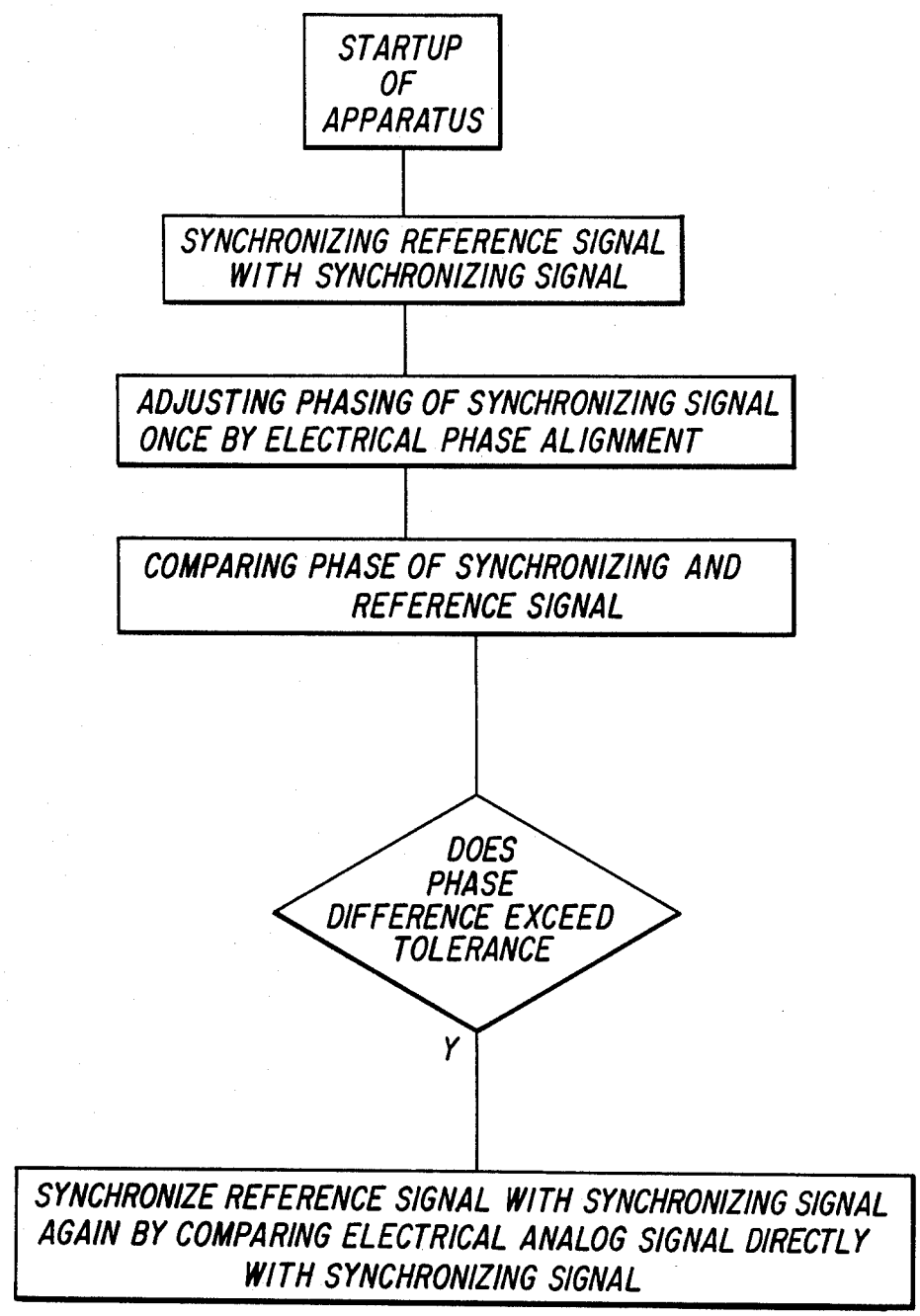

The invention is to be further explained below with the aid of an embodiment shown in the drawing, wherein:

FIG. 1 shows the circuit for the phase synchronization of a stepping motor controlled modulation apparatus, FIG. 2 signal curve after the stepping motor of a modulation apparatus has finished accelerating, FIG. 3 signal curve after automatic synchronization, FIG. 4 signal curve after electrical correction is completed, and FIG. 5 is a flow diagram illustrating the invention.

DETAILED DISCLOSURE OF THE INVENTION

In the diagrammatic representation in FIG. 1, a single-chip microprocessor 1 supplies program and timing-simplifying 2-bit counter signals $2^1$ and $2^0$ from which commutator signals are obtained by means of a logic 2 for a stepping motor 3 (4-phase, unipolar).

The higher-value counter signal $2^1$ is fed directly as a commutator signal W1 to a driver 4 for the winding currents of the stepping motor 3. By negation at inverter 5 there is formed a commutator signal $\overline{W1}$. The counter signals $2^1$ and $2^0$ are furthermore bound together by an exclusive OR gate 6, so that a commutator signal W2 is formed, and a commutator signal $\overline{W2}$ is formed by its negation by inverter 7. The corresponding windings of the stepping motor 3 are energized through the driver 4 according to the state of the 2-bit counter. While the software counter of the singlechip microprocessor 1 is running, the stepping motor 3 runs at corresponding speed and thus drives a sector mirror 8 of a modulator system. The mirror is coupled to the stepping motor 3. In this manner beam switching and modulation take place, which are omitted from the drawing for the sake of simplicity.

Also, a sensor in the form of a reflex coupler 9, in cooperation with the sector mirror 8, forms an optocoupler signal OK. This signal, when fed to the one shot 10 belonging to the logic 2, produces at its output a synchronizing signal SY which is processed in the single-chip microprocessor 1. At the same time, beam modulation of the beam from a radiation source 12 to a detector 13 occurs, via the mirror 8, and a switching occurs between the measurement and reference beam paths (not shown). The detector 13 produces the electrical analog signal AS.

The holding time of the one shot 10 can be adjusted by a variable resistance 11 for the purpose of electrical phase correction.

If, under the control of the single-chip microprocessor 1, synchronization between a reference signal BS within the computer and the synchronizing signal SY is reached, and in addition thereto another modulation system (not shown in the drawing) has been synchronized, the single-chip microprocessor 1 delivers analog demodulation and control signals AWS. FIG. 2 shows, after the stepping motor 3 has reached full speed, its commutator signals W1 and W2, an electrical analog signal AS of the modulator (not shown), the optocoupler signal OK as a sensor signal for synchronizing the analog demodulator and control signals AWS, along with their reference signal BS, with the analog signal AS.

In the correction, the synchronization signal SY, which is formed when the one shot 10 is triggered by the optocoupler signal OK, is made to be of such a length that its synchronizing rear flank is in the right position with respect to the analog signal AS. The synchronization signal SY represented in FIG. 3 is formed. After the setting of the reference signal BS (see arrow) upon each start-up of the circuit according to FIG. 1, the signal curve represented in FIG. 4 develops, while the reference signal BS can be used as the control signal KS for synchronous running, within whose H state the synchronizing flank (e.g., H/L flank) must be situated.

If in this case an error should occur (omitted from the drawing for the sake of clarity), the evaluation of the electrical analog signal AS is interrupted until the phase reference signal is once again synchronized timewise by the single-chip microcomputer 1 with the synchronization signal SY.

The method of the invention is illustrated in the flow diagram of FIG. 5.

We claim:

1. In a method for the phase synchronization of equipment controlled by a stepping drive, in which a stepping motor drives an apparatus synchronized therewith, wherein a synchronizing signal is produced from the phasing of a sensor signal produced by the apparatus for the synchronization of a reference signal for demodulation and control signals with electrical analog signals from the apparatus, the improvement comprising, upon each starting up of the apparatus, making a reference signal as synchronous as possible with the synchronizing signal, adjusting the phasing of the synchronization signal once by electrical phase alignment to the phasing of the electrical analog signal, comparing the phasing of synchronizing and reference signal, and, in the event of a phase difference exceeding tolerance, making the reference signal again synchronous with the synchronizing signal.

2. The method according to claim 1, comprising, for precise correction of the apparatus, comparing at least one electrical analog signal directly with the synchronizing signal, and, for the constant phase comparison between synchronizing signal and reference signal within a tolerance range, using the synchronizing signal to form a control signal that is symmetrical about its synchronizing edge, and using the control signal for comparison with the reference signal.

* * * * *